A. CARRETTE.
SCREWING APPARATUS.
APPLICATION FILED JUNE 26, 1919.

1,353,024. Patented Sept. 14, 1920.

Inventor

Armand Carrette

By H. B. Willson & Co.
Attorney

ARMAND CARRETTE, OF PARIS, FRANCE.

SCREWING APPARATUS.

1,353,024.

Specification of Letters Patent. Patented Sept. 14, 1920.

Application filed June 26, 1919. Serial No. 306,790.

*To all whom it may concern:*

Be it known that I, ARMAND CARRETTE, a citizen of the Republic of France, and residing at Paris, Seine Department, No. 4 Avenue Gustave Gréard, in the Republic of France, engineer, have invented certain new and useful Improvements in Screwing Apparatus, of which the following is a specification.

This invention relates to screw cutting apparatus of the kind described in my earlier patent dated 25 November 1918 and numbered 19,394, in which each of the dies is terminated by a cylindrical head engaged in a recess formed for this purpose inside the casing of the apparatus, wherein it is adapted to oscillate and comprise a stud on one of its faces. Further, in apparatus of this kind one of the closing plates comprises as many grooves as there are dies, and the said stud on each of the dies engages in one of the said grooves; the whole being so constructed and arranged that the rotation of the said plate causes the dies to move away from or toward one another.

The essential features of the present invention are:—

1. The grooved plate is actuated by means of a screw which is so guided as not to be able to rotate, and is pivoted on an axle-pin carried by the plate, and by means of a nut rotating in a support that is pivotally mounted on the casing.

2. The provision of a "flat" on the said axle-pin, and of a groove in the screw to allow of the free passage of said "flat," for the purpose of producing an instantaneous moving apart of the dies.

These arrangements allow of adjusting the position of the plate and consequently the movement of the dies toward or away from one another with absolute continuity. The dies are also adapted to be moved apart instantaneously by disengaging their actuating mechanism; this allows of disengaging the screwing apparatus without having to turn it backward and without loss of time or risk of damage to the tools.

A constructional form of an improved screwing apparatus according to the present invention is illustrated by way of example in the accompanying drawings.

Figure 1:
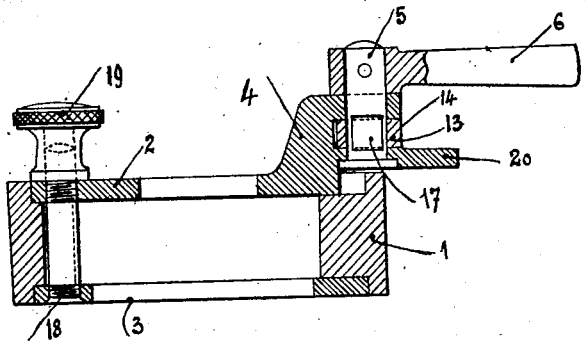
Figure 1 is a vertical section of the improved screwing apparatus on the line A—A of Fig. 2, the dies having been removed.
Figure 2:
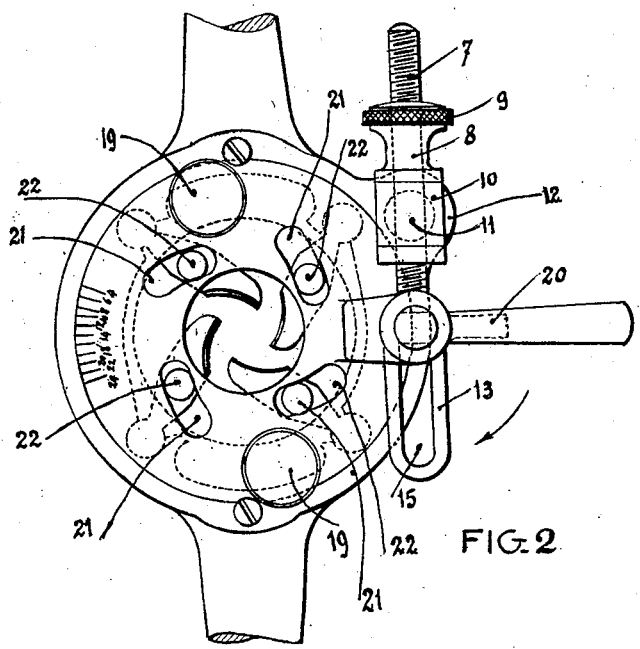
Fig. 2 is a plan of the screwing apparatus.
Figure 3:
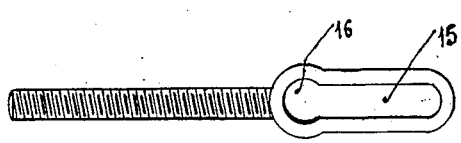
Fig. 3 is a plan of the adjusting screw.

As shown, 1 is the casing of the apparatus; 2 and 3 are the two closing plates mounted so as to be capable of rotating. The upper plate 2 is formed with a boss 4 in which is mounted a vertical axle-pin 5 adapted to be rotated by means of a handle 6.

The rotary motion of the plates is produced by means of a screw 7 and a nut 8. The latter is provided with a knurled head 9 and is adapted to rotate in a horizontal aperture in a part 10 which is mounted by means of a vertical pivot pin 11 on a boss 12 of the casing, and which thus allows the nut and the screw to adjust themselves as a whole freely around the axis of the said pivot pin. The screw 7 is prolonged by a flat part 13 which is engaged in a notch 14 of the boss 4 and is adapted to slide therein. The prolongation 13 has formed in it a slot having a narrow portion 15 and a wide portion 16. The latter corresponds to the diameter of the axle-pin 5 and allows this pin to turn freely therein, whereas the portion 15 corresponds to the thickness of a flat part 17 of the axle-pin 5 and allows the latter to slide in the slot only when the flat part is suitably adjusted in position.

In the position shown, the flat part 17 is situated across the slot 15, so that if the nut 8 is turned in one direction or the other, the screw is compelled to move relatively to the part 10 carried by the casing, and by this means the desired rotation of the plates 2 and 3 is produced in an absolutely continuous manner.

Two clamping screws 18 extending through the plates and provided with nuts 19, allow of locking these plates upon the casing when they have been adjusted into position.

On slacking these screws and on turning the handle 6 in the direction of the arrow in such a manner as to bring the flat part of the axle-pin 5 parallel to the groove 15, it is possible to cause the plates 2, 3, to rotate instantaneously relatively to the casing, for instance by acting upon a projection 20 on the boss 4 which causes the dies to be moved instantaneously apart by the action of the grooves 21 upon the tenons 22.

Claims:

1. In a screwing apparatus comprising screwing dies in the interior of a casing, between plates located on opposite sides of said casing, in which each of said dies is terminated by a cylindrical head engaged in a recess formed for this purpose in the interior of said casing, in which it is adapted to oscillate, and comprising a stud on one of its faces; and in which one of the closing plates comprises as many grooves as there are dies, the said stud of each die being engaged in one of said grooves; the whole being so constructed and arranged that the rotation of said plate causes said dies to move away from or toward one another; an actuating mechanism comprising on one hand a screw so guided as not to be capable of rotating, pivoted on an axle pin carried by the plate, and on the other hand a nut rotatable in a support that is pivotally mounted on said casing, both parts being adapted to allow of effecting a gradual rotating of the grooved plate.

2. In a screwing apparatus comprising screwing dies in the interior of a casing, between plates located on opposite sides of said casing, in which each of said dies is terminated by a cylindrical head engaged in a recess formed for this purpose in the interior of said casing, in which it is adapted to oscillate, and comprising a stud on one of its faces; and in which one of the closing plates comprises as many grooves as there are dies, the said stud of each die being engaged in one of said grooves; the whole being so constructed and arranged that the rotation of said plate causes said dies to move away from or toward one another; the combination of an actuating mechanism comprising on the one hand a screw so guided as not to be able to rotate, pivoted on an axle-pin carried by the plate, and on the other hand a nut rotatable in a support pivoted on the casing, both parts being adapted to allow of causing a gradual rotation of the grooved plate, and means for allowing of shifting at will said axle pin relatively to said screw in such a manner as to cause the plate to turn instantaneously, and thereby produce an immediate moving apart of the dies.

3. In a screwing apparatus comprising screwing dies in the interior of a casing, between plates located on opposite sides of said casing, in which each of said dies is terminated by a cylindrical head engaged in a recess formed for this purpose in the interior of said casing, in which it is adapted to oscillate, and comprising a stud on one of its faces; and in which one of the closing plates comprises as many grooves as there are dies, the said stud of each die being engaged in one of said grooves; the whole being so constructed and arranged that the rotation of said plate causes said dies to move away from or toward one another; the combination of an actuating mechanism comprising on the one hand a screw so guided as not to be able to rotate, pivoted on an axle pin carried by the plate, and on the other hand a nut rotatable in a support pivoted on the casing, both parts being adapted to allow of causing a gradual rotation of the grooved plate, a slideway fixed to said screw wherein the axle pin is engaged and wherein it can be caused to slide in such a manner as to cause the plate to rotate instantaneously and thereby produce an immediate moving apart of the dies; and means for enabling the said axle pin to be locked in position at will.

4. In a screwing apparatus comprising screwing dies in the interior of a casing, between plates located on opposite sides of said casing, in which each of said dies is terminated by a cylindrical head engaged in a recess formed for this purpose in the interior of said casing, in which it is adapted to oscillate, and comprising a stud on one of its faces; and in which one of the closing plates comprises as many grooves as there are dies, the said stud of each die being engaged in one of said grooves; the whole being so constructed and arranged that the rotation of said plate causes said dies to move away from one or toward another; the combination of an actuating mechanism comprising on one hand a screw so guided as not to be able to rotate, pivoted on an axle pin having a flat part, carried by the plate, and on the other hand a nut rotatable in a support pivoted to the casing, adapted to allow of producing a gradual rotation of the grooved plate; and a slideway fixed to said screw, having a wide portion and a narrow portion in which the axle pin is engaged, wherein it can be caused to slide in such a manner as to cause the plate to rotate instantaneously and thereby produce an immediate moving apart of the dies; the whole being so arranged and constructed that when the said flat part is located at right angles to said slideway, the axle pin is locked in position, whereas when said flat part is located parallel to said slideway, the axle pin can be caused to slide along the latter.

In testimony, that I claim the foregoing as my invention I have signed my name in presence of two subscribing witnesses.

ARMAND CARRETTE.

Witnesses:
JOHN F. SIMONS,
MAURICE ROUX.